(12) United States Patent
Orth

(10) Patent No.: US 6,820,773 B1
(45) Date of Patent: Nov. 23, 2004

(54) DELIVERY SYSTEM FOR VOLATILE COMPOUNDS

(75) Inventor: Robert G. Orth, Gerald, MO (US)

(73) Assignee: Apis Discoveries, L.L.C., Gerald, MO (US)

( * ) Notice: Subject to any disclaimer, the term of this patent is extended or adjusted under 35 U.S.C. 154(b) by 0 days.

(21) Appl. No.: 10/248,258

(22) Filed: Dec. 31, 2002

(51) Int. Cl.[7] .............................................. A16L 9/12
(52) U.S. Cl. ........................... 222/187; 239/34; 239/57
(58) Field of Search .......................... 272/187; 239/34, 239/57, 60

(56) References Cited

U.S. PATENT DOCUMENTS

| | | | |
|---|---|---|---|
| 4,948,047 A | * | 8/1990 | Zembrodt ..................... 239/34 |
| 5,115,975 A | * | 5/1992 | Shilling ....................... 239/55 |
| 6,037,374 A | | 3/2000 | Kochansky et al. |
| 6,096,350 A | | 8/2000 | Kemp et al. |
| 6,110,481 A | | 8/2000 | Sirkar et al. |
| 6,204,283 B1 | | 3/2001 | Black et al. |
| 2003/0089791 A1 | * | 5/2003 | Chen et al. ................... 239/35 |

* cited by examiner

Primary Examiner—J. Casimer Jacyna
(74) Attorney, Agent, or Firm—Blumenfeld, Kaplan & Sandweiss, P.C.

(57) ABSTRACT

A method and apparatus for the controlled delivery of volatile compounds is shown for the use in the treatment of honeybee colonies for different honeybee diseases. The method delivers the volatile compounds through the use of microporous membranes. The membranes can be in the form of microporous hollow fiber membranes or microporous flat sheet membranes. The membranes allow for the controlled release of the volatile compounds by the adjustment of the exposed surface area. This allows for delivery of the effective amount of compound during different seasons of the year. In the case of hazardous compounds such as the delivery of formic acid for the treatment of honeybees for parasitic mites the exposure to the beekeeper is minimized and no handling of liquid formic acid is necessary.

17 Claims, 5 Drawing Sheets

DELIVERY SYSTEM FOR VOLATILE COMPOUNDS

BACKGROUND OF INVENTION

1. Field of the Invention

Figure 1:
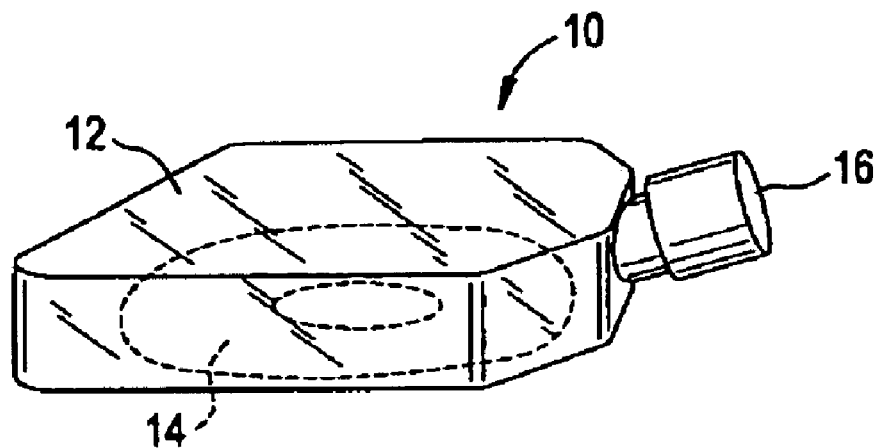

This invention relates generally to porous membranes for the controlled delivery of volatile compounds, and more specifically to a microporous membrane where the pores are non-liquid filled.

2. Description of Prior Art

There are many honeybee diseases that are treated by utilizing volatile compounds. A common use of volatile compounds is in the treatment of honeybees for parasitic mites. In the recent history of the United States bee industry these mites have had devastating effects on both commercial and hobby beekeeping. The two common mites are the tracheal mite (Acarapis woodi) and the Varroa destructor body mite (Varroa jacobsoni). The effects of the mites include the reduction of the bee population in the short term, and ultimately the death of the entire colony.

There are currently several treatments that can be used to control the Varroa mite. These include the use of Tau-fluvalinate. This is applied using a plastic strip which contains the fluvalinate. The bees come in contact with the strip and the fluvalinate kills the mites. This is marketed as Apistan® by Wellmark International. Currently, the mites have begun to show resistance to this treatment in many parts of the US and the world. Because of this, a second treatment has been approved by USEPA under section 18 of FIFRA for emergency use in some states. This is an organophosphate ( O,O-diethyl O-3-chloro-4-methyl-2-oxo-2H-1 -benzopyran-7-yl phosphorothioate ) and it is applied in a similar manner as the fluvalinate. Bayer markets this organophosphate as CheckMite+®. Neither of these treats both the tracheal mite and the Varroa mite.

There is a desire to use alternates to the above pesticides. These alternates include essential oils and formic acid. The formic acid is effective as a vapor but delivery requires a highly concentrated liquid 65% v/v or greater formic acid, which is hazardous to handle because of the corrosive nature of this liquid. In addition, the delivery of the formic acid is not done in a controlled release fashion except by one method, which uses a gel formulation. The gel formulation improves the handling and delivery but does not completely eliminate the need to handle the substance. The formulation was on the market for a short time but has not been sold recently. A gel formulation containing an essential oil, thymol, is sold in Italy to control both tracheal and Varroa mites. It is currently under review for use in the United States but is not currently approved.

The challenge for any miticide that depends on the volatile nature of the compound is the control of the concentration of the volatile compound in the hive. If the compound vapor concentration exceeds a certain level the bees could be adversely affected or the bees could even leave the colony. Second, levels of the compounds in the honey could be excessive which would adversely affect the use of the honey in the market place.

Many methods have been reported in Europe and Canada for the delivery of formic acid. These methods involve the soaking of an absorbent with the formic acid and placing the absorbent into the hive. Other methods use wicks that are placed into the formic acid. All of these methods require the handling of the liquid formic acid.

Furthermore, these absorbents or wick methods do not release the formic acid at a constant rate but in general a large amount is released at the beginning and then it falls off exponentially with time. The gel formulation mentioned previously does not require direct handling of the formic acid but still requires the exposure of the gel and thus the possibility of contact with the gel containing the formic acid.

There has been a report of the use of a membrane-barrier (a nonporous membrane) in the delivery of formic acid. This is a solid membrane and must control the release by the transport of formic acid through the nonporous material. The transport through the nonporous membrane depends on the solubility of the formic acid in the membrane material and the thickness of the material.

U.S. Pat. No. 6,110,481 to Sirkar et al. teaches a controlled delivery device based on aqueous-organic partitioning in porous membranes. The pores of the membrane are filled with water or an organic liquid. The liquid in the micropores has several purposes: 1- to be highly selective;2- control the diffusion process by the type of liquid used in the pores. The process is more like an extraction process where chemical interactions of the liquid in the pore and the solute is important and results in high selectivity. The solute in the solution on the reservoir side dissolves in the liquid in the micropores and is transported through the liquid by diffusion to the other side of the membrane to be delivered to the target. Such a membrane is expensive to produce, and the rate of delivery of the compound through such is too slow to be useful in the application described above, of treating a beehive for mites.

Thus, it is an object of the present invention to develop a method that will consistently deliver the effective dose of volatile compound under many different temperature conditions.

It is a further object of the present invention to provide a delivery system for such volatile compounds that minimizes or entirely alleviates the need to handle the compounds by beekeepers and the like.

It is yet a further object of the present invention to provide a delivery system which provides a high, constant delivery rate and does not require a liquid-filled membrane.

SUMMARY OF INVENTION

With the above objects in mind, the present invention uses hollow, microporous membranes to deliver volatile compounds. The use of microporous membranes will address the concern of handling the compounds. In most cases, exposure to the compound may be avoided altogether after manufacturing. Of course, if the container holding the volatile compound is advertently punctured, there would be some risk of exposure. It will also deliver the vapor at a controlled rate so that the concentration is at an effective level.

In addition, microporous membranes can be made of material that can withstand the highly corrosive nature of compounds such as formic acid. The microporous membrane is typically made of a polymer that has micro channels within the polymeric material. These membranes can be produced so that they are highly uniform in pore size. This gives a high degree of control on the amount of material that can be transported through the membrane. The preferred polymer material is polypropylene, which provides a membrane that is hydrophobic and resistant to passing liquid water and large particles. The high surface tension between the membrane material and the highly polar solution prevents the solution from filling the pores. Thus a formic acid solution greater than 65% v/v would resist filling the pores of the membranes with liquid whereas the vapor would pass.

The porosity of the membrane can range from 20% to 41%, or in some cases even greater. The amount of the vapor emitted depends on the surface area and the porosity of the membrane. In addition, the amount emitted depends on the temperature of the membrane. A higher temperature will cause a higher emission rate. This means that the membranes can be designed to emit a certain amount of compound during different seasons of the year by adjusting the surface area and the porosity. For example, during the heat of summer the surface area of a 41% porosity membrane would be less than that of a fall application when the temperature is lower.

The method of delivery works by first placing the amount of compound needed for a treatment into a container which is suitable for the compound. The state of the compound can be liquid, gel or solid. The liquid, gel or solid must be in contact with the membrane in order to maximize the emission rate. In the case of formic acid the container could be made of polypropylene, polystyrene, or polyethylene. The membrane with the correct surface area for the temperature and emission rate is attached to the container and the container filled and placed in the location where the volatile compound is to be delivered, such as inside a hive. In practice the container would be filled and the membranes covered so no emission would occur. The container would then be shipped in this manner, for instance, to the beekeeper. The beekeeper would remove the covering over the membrane and place the container into the hive. This would minimize contact with the compounds and thereby minimize the exposure of the beekeeper to the compounds.

In contrast to the prior art method of using a nonporous membrane, the pores of the microporous membrane of the present invention are filled with gas. The formic acid plus water vapor is transported through the air in the pores by diffusion and the liquid material does not fill the pore because of the high surface tension difference between the liquid and the membrane material. The diffusion is faster through the gas filled pores as compared to a nonporous membrane where the diffusion takes place within the membrane material. The material surrounding the micro pores (polypropylene for example) is impermeable to the formic acid and water. This faster diffusion in the micro pores allows for a substantial reduction in surface area (approximately 4 square inches as compared to the non porous membranes which uses greater than 100 square inches). The large surface area of the nonporous membrane is a limitation in that the entire container must be composed of a thin nonporous polymer. This means that the possibility for puncturing the membrane is decreased in the present invention as compared to nonporous membranes.

When compared to the liquid-filled porous membrane of Sikkar, the present gas-filled microporous membrane provides a delivery rate a few orders of magnitude greater. Thus, the present invention is usable for delivery of formic acid into a beehive for the treatment of mites, whereas Sikkar is not.

BRIEF DESCRIPTION OF DRAWINGS

The advantages of this invention will be better understood by referring to the accompanying drawings, in which:

FIG. 1 is an isometric view of a container employing the delivery method of the present invention;

FIG. 2 is a cutaway view of the container of FIG. 1;

FIG. 3 is an isometric view of an alternate embodiment of a container employing the delivery method of the present invention, wherein the microporous membrane is located in the lid of the container;

FIG. 4 is a cutaway view of the container of FIG. 3;

FIG. 5 is an isometric view of another alternate embodiment of a container employing the delivery method of the present invention, wherein the membrane has a larger surface area which may be opened to a selected degree;

FIG. 6 is a cutaway view of the container of FIG. 5;

FIG. 7 is a graph showing the delivery of a volatile compound versus time for one tested embodiment of the present invention; and FIG. 8 is a graph showing the delivery of a volatile compound versus time for another tested embodiment of the present invention.

DETAILED DESCRIPTION

Referring now to FIGS. 1 and 2, a delivery system is shown, generally employing a container 10. The container 10 has a plurality of solid walls 12. A flat portion of one wall is removed and replaced with a gas-filled microporous membrane 14. The walls 12 should be composed of a material that is stable to the compound being delivered. For delivery of formic acid, extruded polypropylene works well and is thus preferred. The microporous membrane is preferably made of polypropylene, such as that which is commercially available under the name Celgard® 2400 from Celgard, Inc. of Charlotte, N.C., which is also stable in formic acid. The membrane 14 may be glued to the inside of the wall 12 from which a portion was removed. A solid glue is preferably used with a melting temperature below 163 C. The glue is applied to the wall 12, the membrane 14 placed thereover, and heat applied to melt the glue and bond the membrane 14 to the wall 12. In the simplest form, the opening has a surface area predetermined as necessary for the release of the compound at the required rate, given specific ambient environmental conditions.

It is important to note that the exact surface area of the membrane 14 needed for an application will vary with the particular compound to be delivered, the desired release rate, and the ambient air conditions surrounding the container (such as temperature and barometric pressure). While specific examples are discussed below, which are known to the inventor, most applications will require some trial and error to determine the correct surface area, which should be routine and easily understood by those of ordinary skill in this art.

The container 10 is filled with the volatile compound to be delivered, which may be a liquid, gel, or solid. If a solid is used, the process would work by sublimation of the compound into the micropores and transport to the delivery side by diffusion. An example of a solid compound deliverable with this method is menthol, such as is used for the treatment of tracheal mites. Accordingly, the advantage of minimized direct exposure to the beekeeper is still realized. In the preferred embodiment, a cap 16 is also provided and permanently closed so that manufacture of the container 10 is simplified, yet none of the volatile compound can escape by an inadvertently opened bottle, which would subject the handler to exposure to the compound.

The size of the container 10 may also vary, and may be chosen as a routine matter by one of ordinary skill. For the delivery of a compound to a beehive a typical size would be 7×8×¼ inches, as it could then be fitted between the top frames and inner cover of the hive. The resulting container 10 would then hold 220 mL of volatile compound (formic acid), which would be sufficient for treatment of a beehive for 21 days at a delivery rate of 10 grams per day—the length required for one brood cycle. In the beehive scenario, the width and length of the container 10 are limited by the inside dimensions of the hive. The height, however, is limited by what is placed over the brood chamber. For example, a shallow super could be placed between the brood chamber and the hive tops. This would allow a larger dimension on the depth of the container.

Figure 3:
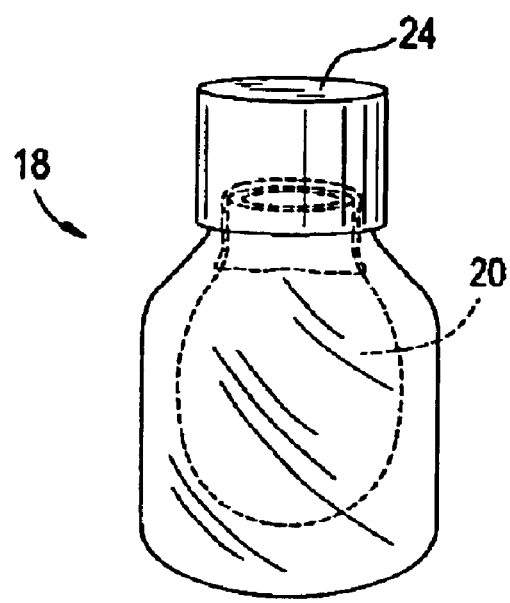
Figure 4:
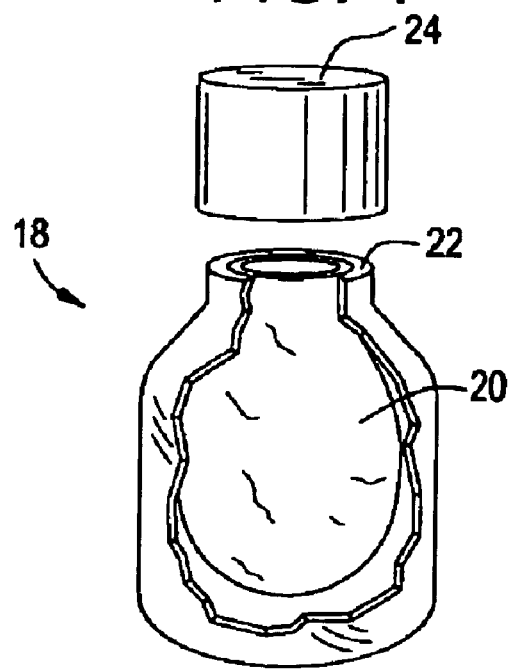

In applications where a very small surface area is needed, an alternate apparatus may be used, as is shown in FIGS. 3 and 4. Here a container 18 is used where the volatile compound is contained within a microporous polypropylene bag, 20. The bag 20 is then sealed to an opening in the neck 22 of the container 18. Thus the delivering membrane is integrated into the neck 22 of the container 18. A cap 24 is once again provided, which in this embodiment allows for the quick sealing and opening of the container 18. With the cap 24 removed and the container 18 held upside down (neck 22 side down), the volatile compound in the bag 20 is released. With the cap 24 replaced, no volatile compound is permitted to escape. It should be noted that the limited surface area of the membrane in this embodiment may require multiple containers to be used to produce the desired delivery rate.

In another embodiment of the invention, the delivery is accomplished by attaching a plurality of gas-filled microporous hollow fibers to a reservoir containing the volatile compound. The volatile compound is kept isolated from the anterior opening of the fibers by a valve or other mechanical separation device. For delivery, the valve is opened or the separation device removed, which allows the volatile compound to migrate through the fibers to the distal openings thereof, where the compound is emitted as a gas. Again, the delivery rate will be dependent upon the porosity of the fibers. In the preferred embodiment for the delivery of formic acid, the fibers are made of polypropylene, such as that made by Celgard®.

Figure 5:
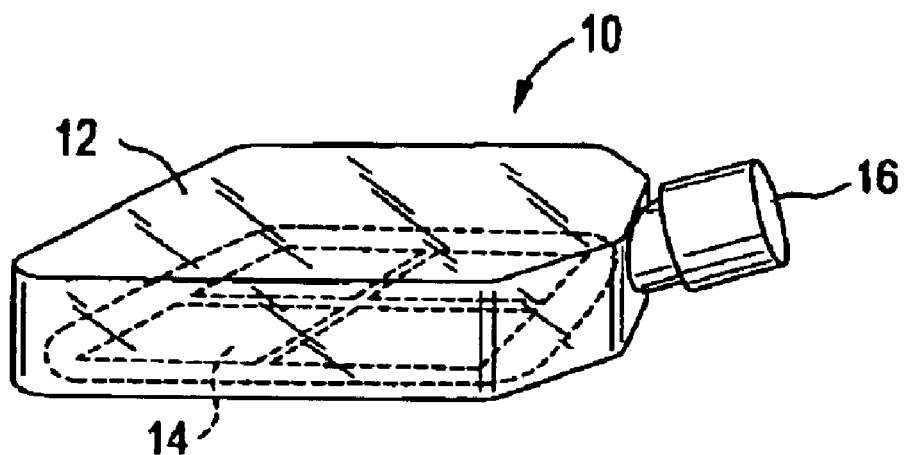
Figure 6:
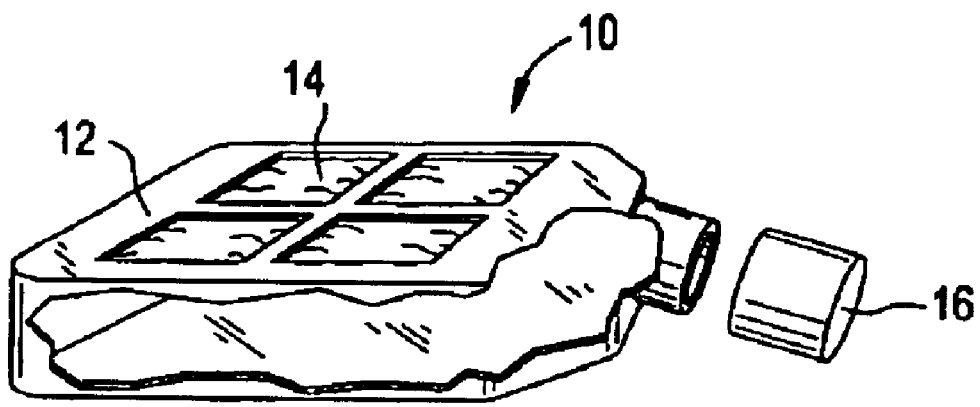

In the preferred embodiment, shown in FIGS. 5 and 6, the delivery rate is controlled primarily by controlling the surface area of the exposed membrane. This embodiment is very similar to that shown in FIGS. 1 and 2, except that the container has a grid on the bottom wall so as to effectively make a plurality of openings, all covered by the membrane (or optionally each hole is independently covered by separate membranes. The porosity of the membrane is selected to be an average of the necessary porosity for the desired delivery rate, and then the precise delivery rate is fine tuned by covering or opening the appropriate number of openings, effectively altering the surface area of the membrane.

Figure 2:
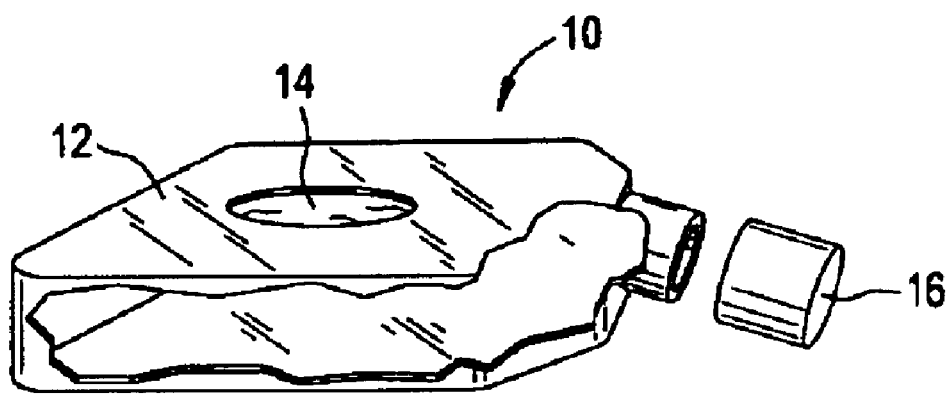

It should also be noted in the preferred embodiments, both those shown in FIGS. 1 and 2, as well as FIGS. 5 and 6, there should be a microporous venting in the cap. For formic acid delivery, the venting should ideally be micropores 2 microns in size, although smaller mircopores should also work. This will allow air to enter the container and fill the headspace without allowing significant amounts of the formic acid (or other volatile compound) to escape, thus preventing a large vacuum from building up in the container, which could affect delivery rate. Significant amounts of the volatile compound will not escape because the surface area of the cap is so small and additionally the liquid should not be in contact with the cap membrane, thus also reducing the amount that escapes. Nonetheless, an impermeable seal should be placed over the cap, as well as the main membrane, during shipping to prevent premature escape of any of the volatile compound.

EXAMPLE 1

Emission Rate of 67% Formic Acid

In the first example, the plurality of microporous fibers embodiment was used, with 240 fibers having a height of 11.6 cm and a diameter of $280 \times 10^{-6}$ m. This produces a surface area for each fiber of $5.1 \times 10^{-5}$ m$^2$, or a total surface area of 122 cm$^2$. The air flow over the distal ends of the fibers at the beginning of the test was 854 mL/min. A later measurement was taken with an airflow of 375 mL/min. The formic acid reservoir was a graduated burette, allowing for the easy measurement of the volume of formic acid lost over the time of the measurement.

The results of this test are shown in Table 1. The flow rate of air over the distal ends of the fibers affects the delivery rate. The higher flow rate of air produced a significantly higher delivery rate of the formic acid. Because bees tend to ventilate their hives to remove the formic acid, it is believed that the initial air flow rate reading more closely resembles the actual air flow conditions in a beehive. The resulting delivery rate would accordingly be, approximately 30 g/day. 10 to 20 g/day is what is considered optimal for an effective treatment of both Varroa and tracheal mites.

TABLE 1

| AIR FLOW RATE (mL/min) | ELAPSED TIME (hr:min) | VOLUME LOST (mL) | DELIVERY RATE (g/day) |
|---|---|---|---|
| 854 | 1:36 | 1.75 | 30 |
| 854 | 2:58 | 2.7 | 27 |
| 375 | 3:28 | 2.5 | 20 |

EXAMPLE 2

Flat Sheet Microporous Membrane Delivery of Formic Acid within a Beehive

This example demonstrates that the microporous flat sheet surface area can be adjusted to deliver different amounts of formic acid and that the delivery rate depends on ambient temperature. This was done by using a polystyrene container (250 mL Corning Costar vented culture flask from Fisher Scientific, Inc.) and cutting a 1 inch diameter hole in the bottom of the container. A Celgard 2400 microporous flat sheet membrane was attached to the container using polypropylene glue. This gave an effective area of 0.785 in$^2$ or 5.07 cm$^2$. The membrane had an average porosity of 37% and a pore size of 0.117 microns by 0.042 microns. The thickness of the membrane was 25 microns. The melting point is 163 C, which is what allows this to be attached to the polystyrene container using polypropylene glue.

A second similar container was made which had four square holes placed in the bottom of the container. Each hole had a surface area of 0.902 in$^2$ or 5.82 cm$^2$. One membrane the same as was used in the preceding paragraph covered all four holes and was attached the same as the preceding membrane. Thus, the effective surface area was 3.61 in$^2$ or 23.28 cm$^2$.

The containers were placed in the middle top frames of a 3 medium deep beehive. The membrane was on the bottom toward the brood section of the hive. Since the containers would not fit between the frames and the inner cover a medium super containing no frames was placed above the three mediums. At different time intervals the volume of the formic acid remaining in the container was measured using a 100 ml graduated cylinder. The mass lost was determined by multiplying the density of the 67% v/v formic acid (1.158 g/mL) times the measured volume loss. The average daily temperature was found using data from the National Weather Service for the location of the test, St. Louis, Miss.

Figure 7:
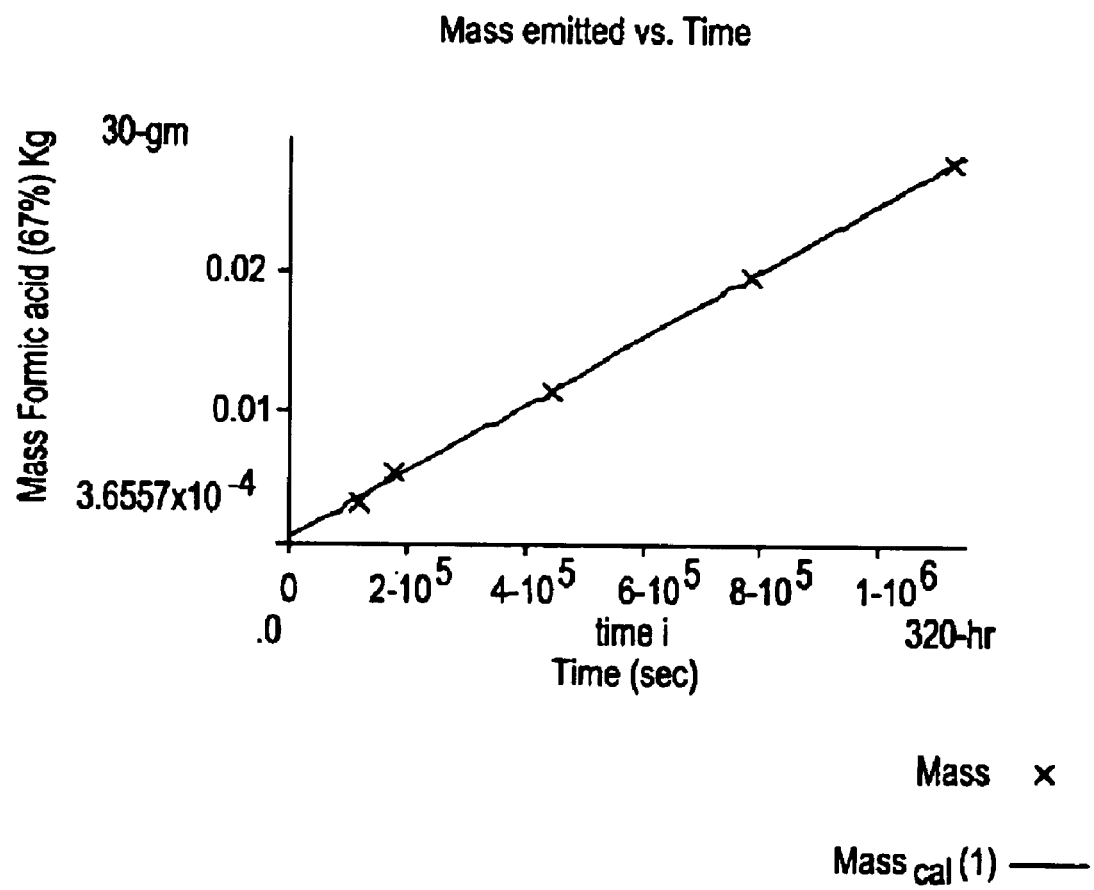

Table 2 shows the results of the first system. After 32 hours, the total mass lost was 2.9 g. After 48 hours an additional 2.32 g was lost. The average temperature is also shown and a plot of the total delivery versus time is shown in FIG. 7. A linear least squares fit is also shown, indicating that the delivery rate was linear and had a rate of 2.16 g/day. This figure also shows that the delivery rate remained linear over the entire 311 hours, which is expected as the average temperature changed little during the test.

TABLE 2

| HOURS | TOTAL MASS DELIVERED (g) | AVERAGE DAILY TEMPERATURE (° F.) |
|---|---|---|
| 32 | 2.90 | 72 |
| 48 | 5.22 | 75 |
| 122 | 11.12 | 76 |
| 216 | 19.7 | 77 |
| 311 | 28.4 | 76 |

Figure 8:
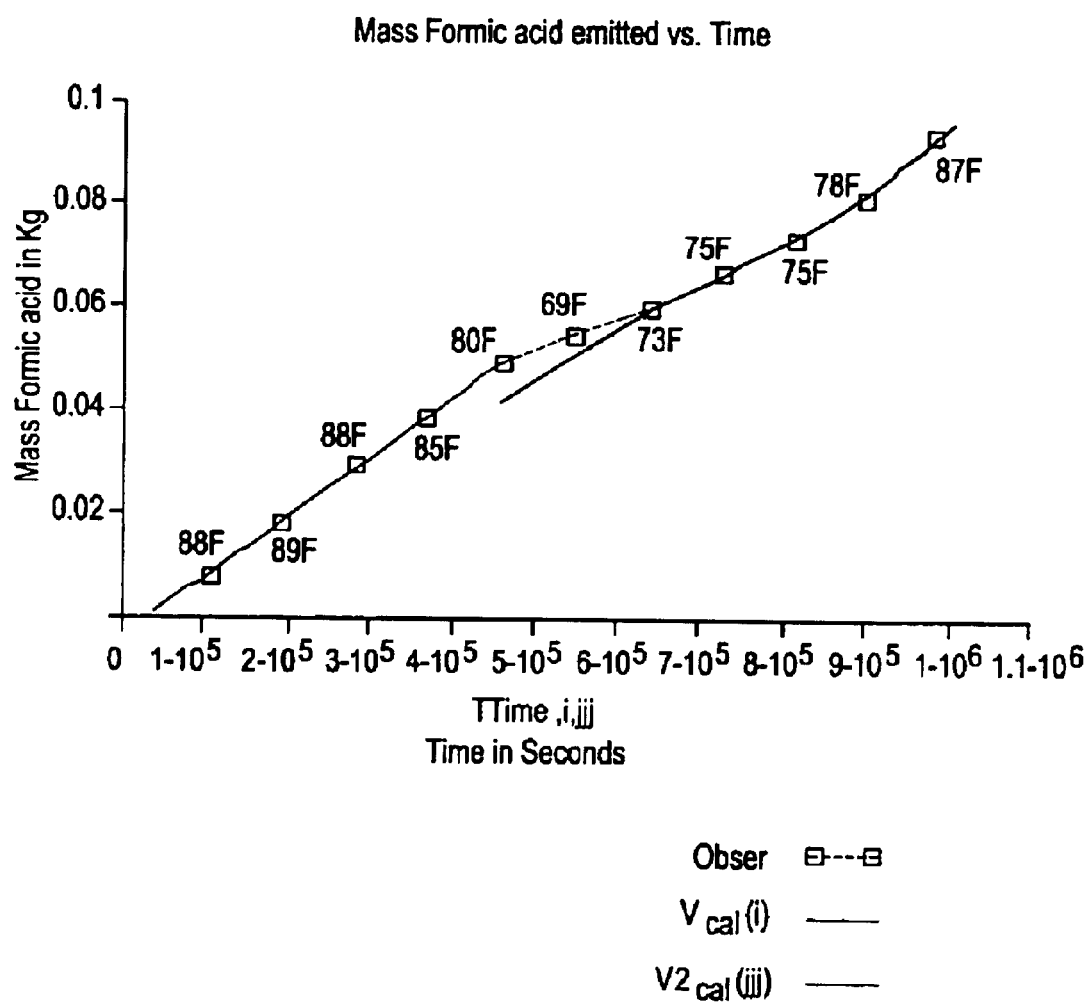

Table 3 shows the results from the second system. The data is again plotted and can be seen in FIG. 8. Again, the delivery rate was linear, but changed when there was a significant change in the ambient temperature. Thus, it can be concluded that temperature is a factor in the delivery rate, but at a given temperature and membrane (including surface area) the resulting delivery rate should be consistent using the method of the present invention.

TABLE 3

| HOURS | TOTAL MASS DELIVERED (g) | AVERAGE DAILY TEMPERATURE (° F.) |
|---|---|---|
| 29.68 | 7.53 | 88 |
| 53.27 | 17.96 | 89 |
| 77.85 | 29.55 | 88 |
| 101.93 | 38.82 | 85 |
| 127.24 | 49.25 | 80 |
| 151.18 | 55.04 | 69 |
| 176.26 | 59.64 | 73 |
| 200.68 | 67.44 | 75 |
| 223.67 | 74.74 | 75 |
| 248.25 | 82.57 | 78 |
| 272.25 | 91.55 | 87 |

While the foregoing is directed to the preferred embodiments of the present invention, other and further embodiments of the invention may be devised without departing from the basic scope thereof, and the scope thereof is determined by the claims which follow.

What is claimed is:

1. A method of delivering a volatile compound at a controlled rate, the method comprising the steps of:

providing a reservoir containing the volatile compound to be delivered;

wherein the volatile compound to be delivered is formic acid plus water vapor;

fitting a portion of the reservoir with a membrane permeated with a plurality of micropores, wherein the micropores are not filled with a liquid; and placing the compound to be delivered in contact with the membrane having the plurality of micropores.

2. The method of claim 1, wherein the formic acid plus water vapor is in liquid form.

3. The method of claim 1, wherein the formic acid plus water vapor is in gel form.

4. The method of claim 1, wherein the formic acid plus water vapor is in solid form.

5. The method of claim 1, wherein the reservoir is composed of a non-porous polymer.

6. The method of claim 5, wherein the non-porous polymer is taken from the group comprising polypropylene, polystyrene, and polyethylene.

7. The method of claim 1, wherein the membrane is made of polymeric material.

8. The method of claim 7, wherein the polymeric material of the membrane is polypropylene.

9. The method of claim 1, wherein the membrane has a porosity of at least twenty percent.

10. The method of claim 9, wherein the porosity of the membrane is between twenty percent and forty-one percent.

11. The method of claim 1, wherein the micropores are highly uniform in size.

12. An apparatus for the controlled delivery of volatile compounds, the apparatus comprising:

a reservoir adapted to contain the volatile compound, said reservoir having a planar bottom surface;

wherein said volatile compound is formic acid plus water vapor; an aperture in said bottom surface; and a membrane covering said aperture, said membrane having a plurality of micropores void of any liquid, wherein said membrane is adapted to be in direct contact with said formic acid plus water vapor.

13. The apparatus of claim 12, wherein said reservoir is composed of a nonporous polymer.

14. The apparatus of claim 12, wherein said membrane is hydrophobic.

15. The apparatus of claim 12, wherein said membrane is a polymer.

16. The apparatus of claim 15, wherein the polymer said membrane is polypropylene.

17. The apparatus of claim 12, further comprising a seal disposed on said reservoir other than on said bottom surface, said seal having microporous venting.

* * * * *